Patented Aug. 31, 1943

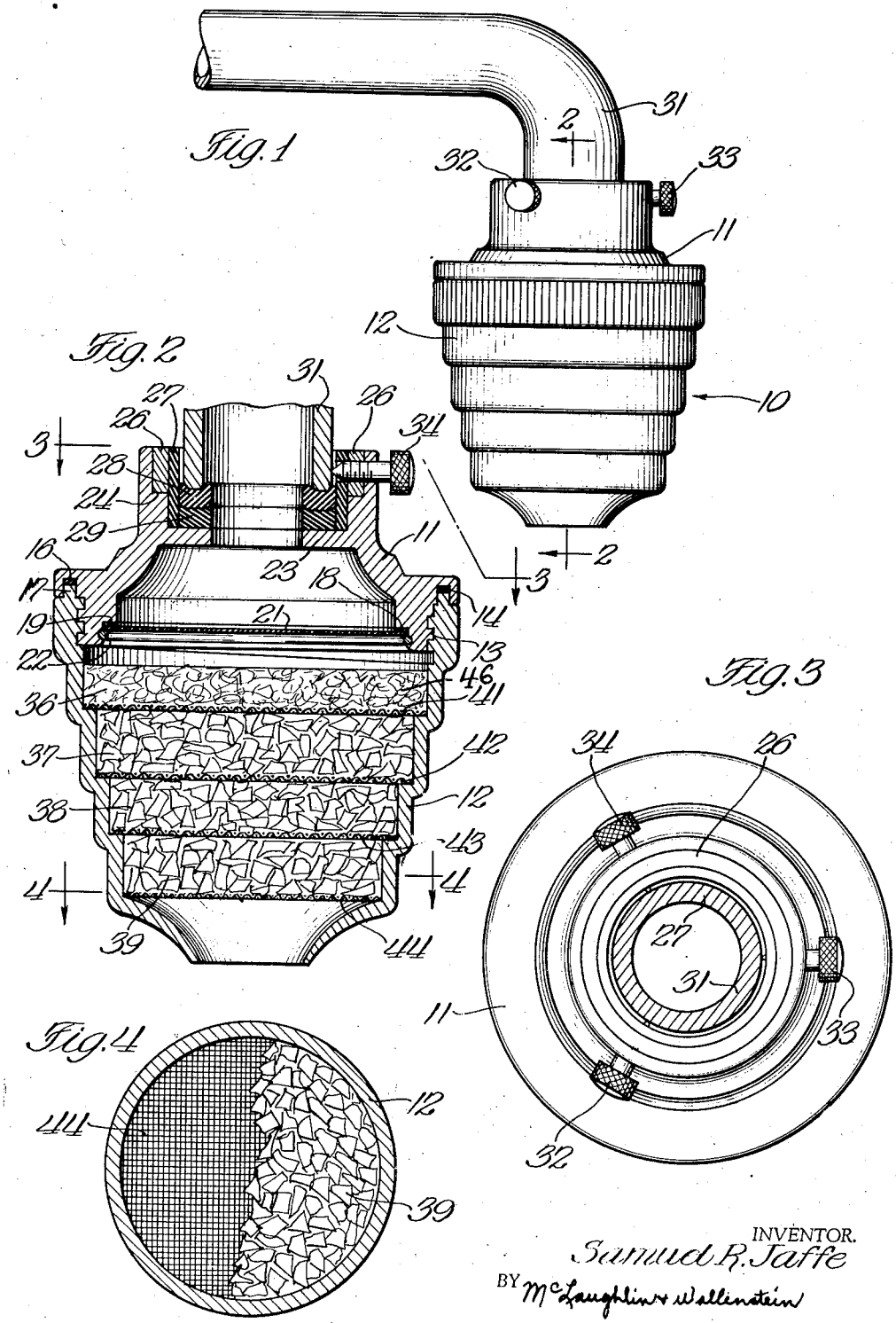

2,328,381

UNITED STATES PATENT OFFICE 2,328,381

PIPE JOINT

Samuel R. Jaffe, Chicago, Ill.

Application August 28, 1940, Serial No. 354,570

3 Claims. (Cl. 285—161)

My invention relates to faucet attachments and is particularly concerned with a novel spray and filter construction.

An important object of my invention is the provision of a combination spray and filter attachment which is simple in construction, inexpensive, and which can readily be utilized either as a spray or as a filter.

Another object of my invention is the provision of a combination spray and filter attachment made of a molded synthetic plastic with novel means for firmly attaching the device to faucets of variable size or diameter and in such a way as to minimize the possibility of breakage of the attachment.

Another object of my invention is the provision of a device of the character described which consists of a very few parts and which can quickly and expeditiously be disassembled and reassembled when renewing the filtering element or elements from time to time.

These and other objects will become more apparent in connection with a consideration of the following detailed description taken in conjunction with the drawing which illustrates a preferred embodiment of my invention and wherein Figure 1 is an elevational view showing my novel spray and filter in position on a faucet;

Figure 2 is a section taken along the line 2—2 of Figure 1, looking in the direction of the arrows;

Figure 3 is a view taken along the line 3—3 of Figure 2, looking in the direction of the arrows; and Figure 4 is a view taken along the line 4—4 of Figure 2, looking in the direction of the arrows.

In general, my device comprises two sections each of which is preferably made from a molded synthetic plastic or synthetic resin, for example, of the phenol-formaldehyde, urea-formaldehyde, or other similar type. The upper section is provided with a spray disc in the form of a perforated metal or like plate with openings of a size such as to produce a spray of water of the character desired, for example, in connection with the washing of dishes and the like. The upper section is also provided with means for attaching the same to faucets of various diameters and for firmly fastening said section thereto..

The lower section comprises a filter member, said lower section being removably attached to the upper section in any suitable manner, preferably by a screw threaded arrangement. The lower section comprises a plurality of filtering chambers of progressively decreasing diameter in a downward direction with outlet means at the bottom of said lower section. Each of the chambers is filled with a suitable filtering material or materials and the contents of said chambers are maintained separately from each other by means of screens or apertured plates.

Referring now to the drawings the spray and filter member, indicated generally by the numeral 10, comprises an upper section 11 which may be called a spray section, and a lower section 12 which may be called a filter and purifier section or member. The sections 11 and 12 are removably connected to each other, as shown in Figure 2, through screw threaded portions 13 located at the lower part of exterior surface of section 11 and at the upper part of the interior surface of section 12. A gasket 14 of rubber or other suitable material fits into a peripheral groove 16 in the section 11, against which gasket an extension 17 of the section 12 is adapted to press when the sections 11 and 12 are screwed together.

The upper or spray section 11 is provided on its inner periphery adjacent its bottom with a cut out portion defining a peripheral shoulder 18 against which, through the cork or similar gasket 19, a spray plate 21 rests. The spray plate comprises a metal disc having a solid center portion and a large number of small apertures therearound, preferably in about five concentric rows, additional apertures not concentrically arranged being preferably provided to increase the spraying effect. Such spray discs are per se well known in the art and any suitable one may be selected to produce a spray of the specific character desired. In order to hold the spray plate or disc 21 against displacement, I provide a spring metal split ring 22 which, in part, fits into a groove in the section 11 and rests against the spray plate 21, as clearly shown in Figure 2. The split ring arrangement for locking the spray disc 21 against displacement is especially useful in those cases where the section 11 is made of certain synthetic plastics or resins and the like which have a tendency to expand when hot water in maintained in contact therewith. The described arrangement insures against the spray plate 21 dropping out or being displaced when used under conditions where expansion of the section 11 would occur.

The upper portion of the section 11 is provided with novel means for attaching said section to a faucet. Said portion is tubular in shape, terminating at its lower part in a shoulder 23 formed integrally with the section 11, said shoulder defining an opening through which water from the faucet passes to project against the spray plate 21. The upper part of the tubular portion is so shaped as to provide a shoulder 24 upon which rests a metal collar 26, preferably of brass or any other non-corrodible metal, which collar is desirably placed in position in the wall when the section 11 is molded. This collar serves to strengthen the construction, particularly when the section 11 is made of a synthetic plastic or resin, and insures against breakage of the section when it is locked on the faucet. A rubber or other resilient bushing 27 is suitably disposed against the metal collar 26 and rests, at its bottom, on the shoulder 23, as is clearly shown in Figure 2. A plurality of washers 28 and 29 of relatively soft and resilient rubber is supported on the shoulder 23 so that, as shown in Figure 2, the outlet end of a faucet 31 may be forced thereagainst so as to provide a tight seal between the edge of the faucet and the washer 28. While I have shown two washers, 28 and 29, it will be understood that only one need be used. The shape and length of the particular faucet to which my combination spray and filter are to be attached will determine the exact character and number of the washers to be employed.

Disposed about the periphery of the section 11, adjacent the upper portion thereof, are locking screws 32, 33 and 34, the shanks of which pass through the section 11, the metal collar 26 and the bushing 27. The ends of the shanks are preferably somewhat pointed so that they may somewhat dig into the faucet and hold the section 11 firmly thereon. As shown more particularly in Figure 3, the locking screws preferably are spaced apart substantially equidistantly about the periphery of the upper part of the section 11.

The lower section 12, which, as pointed out hereinabove, is the filter section, comprises a plurality of vertically disposed filter chambers 36, 37, 38 and 39. A suitable number, as shown in the drawings, is four, although more or less may be employed. The filter chambers, as shown, are of progressively decreasing diameter downwardly and, resting on the shoulders formed between the successive chambers, are screens 41, 42, 43 and 44, said screens serving to hold the filter and purifying media within the respective filter chambers. The lower portion of the section 12 is open and serves as the outlet means.

Disposed in the chamber 36 is a cloth filtering pad 46, preferably of cotton batting or similar material of relatively low cost and spongy or springy character and having good filtering characteristics without interfering unduly with the free flow of water therethrough. Carbonaceous filter material preferably is disposed in the chambers 37, 38 and 39. Thus, for example, the chamber 37 may contain coarse, ground charcoal; the chamber 38 ground coke; and the chamber 39 more finely ground charcoal. It will be understood that any suitable filtering or deodorizing or like materials may be utilized as the filter and purifying media, especially satisfactory results having been obtained with the combination of materials described.

In use, the spray and filter member is attached to the faucet of a kitchen sink or the like and locked in rigid position by means of the screws 32, 33 and 34. Filtered water issues in a steady stream. If it is desired to use the spray member only, as, for example, in connection with the washing of dishes, the spraying of vegetables or the like, the lower or filter section 12 is unscrewed and removed from the upper or spray section. The device will then function in the ordinary manner to provide the spray. If a steady stream of filtered water should then be desired, this is accomplished simply by screwing into position the filter section 12. To facilitate the assembly and disassembly of the sections 11 and 12, a knurled surface is provided on the periphery of the filter section 12 adjacent the upper part thereof, as shown in Figure 2 of the drawing. It will be understood that the filter material 46 will be replaced from time to time, preferably every day or two, so that a thoroughly filtered water is constantly assured. These filtering materials are inexpensive and, as can readily be seen, may be replaced very quickly and expeditiously. The properties of the carbonaceous filtering materials in the sections 37, 38 and 39 are unaffected over very long periods of time and, it will be understood, therefore, that such carbonaceous material need be replaced only extremely seldom.

It will be seen that I have devised a simple and inexpensive combination spray and filter which produces highly satisfactory results. While I have described a preferred embodiment of my invention, it will be appreciated that various changes may be made, in the light of my teachings, without departing from the spirit thereof as pointed out in the claims.

What I claim as new and desire to protect by Letters Patent of the United States is:

1. In an attachment for water faucets, a generally tubular member which is adapted to fit over a faucet, said tubular member being made of a molded plastic, a metal collar disposed on the inner periphery of said tubular member adjacent the upper portion of said tubular member, and means to fasten said tubular member tightly on the faucet.

2. In a spray attachment for water faucets, a generally tubular member which is adapted to fit over a faucet, said tubular member being made of a molded plastic, a metal collar disposed on the inner periphery of said tubular member, and a plurality of spaced screws on said tubular member to fasten said tubular member tightly on the faucet.

3. In a spray device for attachment for water faucets, a generally tubular member which is adapted to fit over a faucet, said tubular member being made of a molded plastic, a metal collar disposed on the inner periphery of said tubular member adjacent the upper portion of said tubular member, said tubular member being provided with an inwardly extending shoulder portion, an apertured resilient member resting on said shoulder and adapted to be compressed by the end of the faucet, when the tubular member is in position on said faucet, to provide a tight seal, and means for locking said tubular member to said faucet against movement of said tubular member thereon.

SAMUEL R. JAFFE.